United States Patent [19]

Hitson

[11] Patent Number: 4,634,184
[45] Date of Patent: Jan. 6, 1987

[54] ADJUSTABLE SEAT BELT ATTACHMENT FOR VANS

[75] Inventor: Herbert A. Hitson, Roanoke, Ala.

[73] Assignee: Monitor Manufacturing Company, Smyrna, Ga.

[21] Appl. No.: 777,958

[22] Filed: Sep. 19, 1985

[51] Int. Cl.[4] .................. A62B 35/00; B60R 22/26
[52] U.S. Cl. ........................ 297/468; 248/298; 297/349
[58] Field of Search ............... 297/416, 468, 470, 473, 297/485, 349; 248/1 J, 172, 224.4, 298, 670; 280/801; 211/135, 175; 108/140, 142

[56] References Cited

U.S. PATENT DOCUMENTS

| | | | |
|---|---|---|---|
| 2,101,474 | 12/1937 | Minters | 248/172 |
| 2,619,307 | 11/1952 | Cramer | 248/500 X |
| 3,127,021 | 3/1964 | Nolen | 211/175 |
| 3,199,464 | 8/1965 | Shook | 211/175 |
| 3,206,249 | 9/1965 | Gateley | 248/172 X |
| 4,120,531 | 10/1978 | Fefferman | 297/349 |
| 4,238,135 | 12/1980 | Sandham | 297/468 |

Primary Examiner—James T. McCall
Assistant Examiner—Peter R. Brown
Attorney, Agent, or Firm—James B. Middleton

[57] ABSTRACT

An adjustable seat belt mount for conversion vans and the like. The pedestal for receiving the seat has a rear skirt and side skirts, and a slot is defined at the rear corner of the seat receiving platform. The seat belt bracket includes a belt connector flange and a tongue extending from the flange. The tongue extends through the slot, and is adjustable in the slot. Screws pass through holes in the tongue and in the rear skirt to fix the tongue to the rear skirt. The seat belt bracket is then held by being fixed to the rear skirt and bearing against the edge of the slot.

1 Claim, 3 Drawing Figures

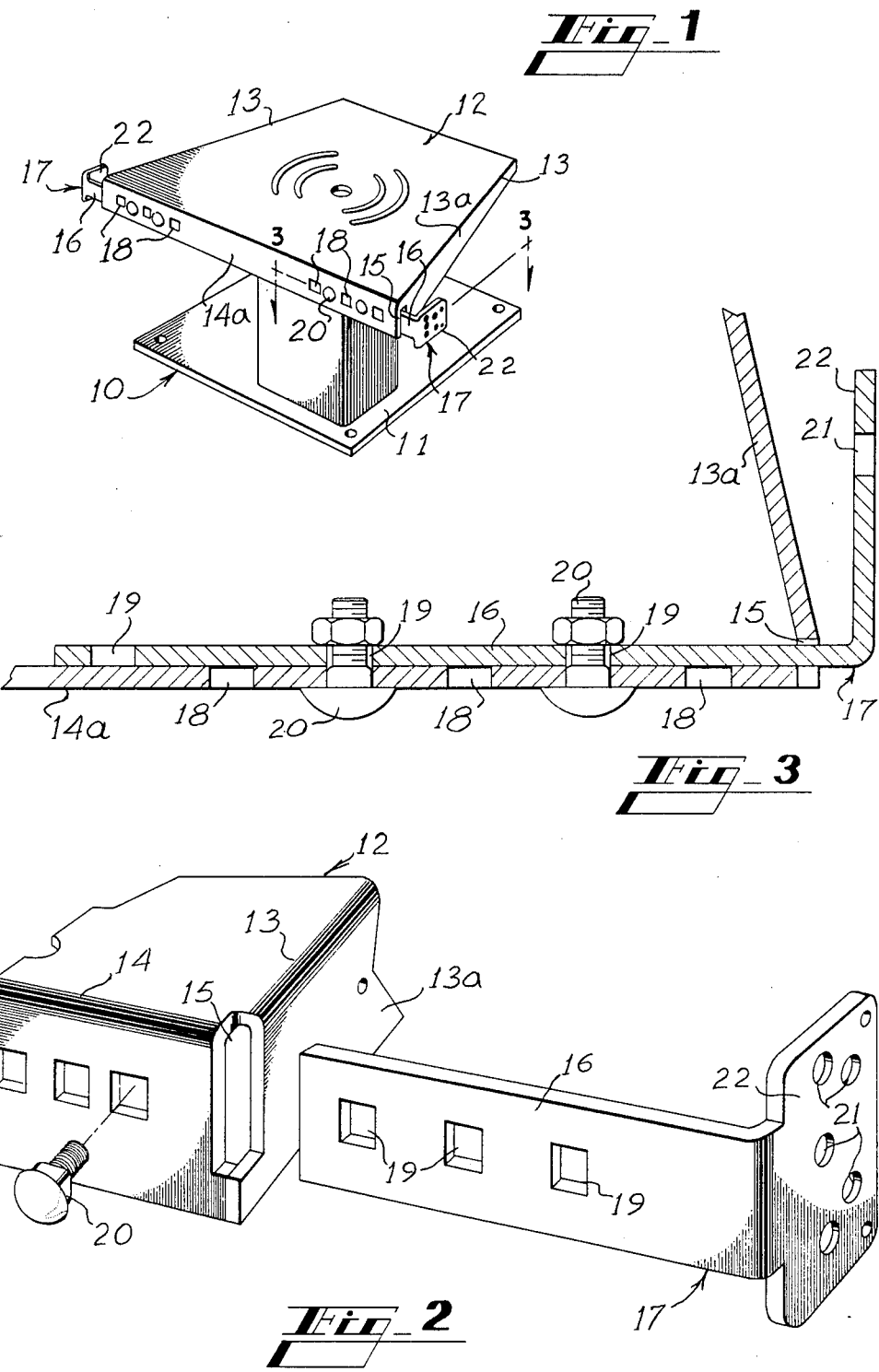

ADJUSTABLE SEAT BELT ATTACHMENT FOR VANS

INFORMATION DISCLOSURE STATEMENT

In the United States, the sale and use of recreational vehicles, vans, campers, trailers and motor homes has enjoyed an ever-increasing popularity, and a thriving industry has evolved to provide elegant interior furnishings for the owners of such vehicles. A basic item of furnishings for these vehicles is customized vehicular chairs, especially for the seat for the driver of the vehicle. These chairs, or seats, generally take the form of ample, well padded, high-back chairs with arms, mounted on fixed or swivel pedestals. The chairs themselves may be fixed or tilt adjustable, and slideably adjustable on their pedestals.

Customizing recreational vehicles, vans, campers, trailers, and motor homes is a large industry, but the legally required installation of seat belts in vehicles creates considerable problems because seat belts are made in various models by many manufacturers. The connection plates provided with seat belts have mounting holes varying in size, dimension and configuration from model to model and manufacturer to manufacturer. Furthermore, the seats to be installed vary considerably in width, rendering attachment of the seat belts firmly to the pedestal as is required by law quite difficult in some cases. Prior efforts at mounting the various seat belts to a pedestal have included the use of welded-on spacers and the like, but this is expensive and unattractive, and may not be strong enough to meet legal standards.

SUMMARY OF THE INVENTION

This invention relates generally to improved vehicular chair mounts, and is more particularly concerned with an adjustable seat belt attachment therefor.

The present invention provides an adjustable seat belt mount that can be quickly and easily installed, and is adaptable to a wide range of seat sizes and shapes, as well as a wide range of seat belt models of diverse manufacturers. One preferred embodiment of the invention comprises a seat belt connector plate having a lateral extension therefrom, the extension, or tongue, being slideably receivable by the seat pedestal, and fastening means selectively secure the extension in place at the desired position. The connector plates have pre-cut holes of various sizes and dimensions in a configuration which will match the holes in the connection plates of most commercially available seat belts, thus facilitating installation of the seat belts.

BRIEF DESCRIPTION OF THE DRAWINGS

These and other features and advantages of the present invention will become apparent from consideration of the following specification when taken in connection with the accompanying drawings in which:

FIG. 1 is a perspective view of a vehicular seat mounting pedestal including seat belt attaching means embodying the present invention;

FIG. 2 is an enlarged perspective, exploded view of one seat belt bracket, and the pedestal receiving means for the bracket; and, FIG. 3 is an enlarged cross-sectional view taken generally along the line 3—3 of FIG. 1.

DETAILED DESCRIPTION OF THE EMBODIMENT

Referring now more particularly to the drawings and to that embodiment of the invention here chosen by way of illustration, FIGS. 1 through 3 show a vehicular chair pedestal 10 having a base 11 for attaching the pedestal to the floor of the vehicle and a platform 12 for receiving a vehicular chair, or seat, on the pedestal.

The two sides 13 and the rear 14 of the platform 12 have downwardly turned edges to form vertically extending skirts 13a and 14a. The edges 13 and 14 are preferably notched before bending so that a slot 15 is formed when the edges are turned down. The slot 15 will slideably receive the tongue 16 of the seat belt bracket 17 with the tongue 16 lying contiguous to the rear skirt 14a.

With attention especially to FIGS. 2 and 3, it will be seen that there is a series of uniformly spaced holes 18 cut through the rear skirt 14a. Similarly, a series of uniformly spaced holes 19 is cut through the tongue 16, having a spacing commensurable with the spacing of those cut through the rear skirt 14a. In the preferred embodiment, the holes 19 in the tongue 16 are cut on a spacing which is twice the spacing as that of the holes 18 in the rear skirt 14a so a large number of positions will be available in which at least two holes are aligned to receive two fastening means. The tongue 16 of the seat belt bracket 17 is thus slideably adjustable horizontally in the slot 15 and may be firmly attached to the rear skirt 14a of the platform 12 by a plurality of fasteners such as bolts and nuts 20 at an appropriate location to accommodate the installation of the seat belt in relation to the seat.

A group of holes 21 is percut through the seat belt connector plate 22 of the bracket 17. The holes 21 are of appropriate sizes and dimensions, and in an appropriate configuration, to match the mounting holes in the connection plates of the seat belts sold by most manufacturers.

From the foregoing description, it will be seen that the present invention provides seat belt attaching means for a seat pedestal wherein a single pedestal can be used, and the same seat belt attaching means can be used for a wide variety of vehicles, seats, and seat belt apparatus. If the seat is wide, the tongues 16 of the seat belt brackets 17 will be slid outwardly until the connector plates 22 are adequately beyond the seat for easy connection of the seat belt apparatus. Alternatively, if the seat is narrow, the tongues 16 of the brackets 17 will be urged inwardly until the connector plates 22 are immediately beside the seat. In any desired position, at least two of the holes 18 and 19 will be aligned to receive bolts 20 or other appropriate fastening means. The holes 21 will allow a seat belt mechanism to be mounted high when required to clear the floor and the pedestal mechanism, or to be mounted low when space allows. Also, at least two holes will always be useable so the seat belt mechanism is held for rotating.

In all positions, the seat belt mounting means of the present invention provides adequately firm mounting to comport with the law, while conforming to the desired comfort and attractiveness standards.

It will of course be understood by those skilled in the art that the particular embodiment of the invention here presented is by way of illustration only, and is meant to be in no way restrictive; therefore, numerous changes and modifications may be made, and the full use of

I claim:

1. A seat pedestal for vans and the like, said seat pedestal including a base for fixing said pedestal to the floor of a van, a platform for receiving a seat thereon, and a pair of seat belt brackets for receiving seat belts, said platform including a vertical skirt comprising two side skirts and a rear skirt, each of said two side skirts defining a slot with said rear skirt for providing a pair of slots for receiving said seat belt brackets, each seat belt bracket of said pair of brackets including a connector plate for attachment of a seat belt, a tongue extending from said connector plate generally at a right angle thereto, said tongue being slidably receivable through said slot, and fastening means for selectively fixing said tongue to said rear skirt, the arrangement being such that said tongue is disposable parallel and adjacent to said rear skirt and fixable thereto, and said tongue extends through said slot and bears against said side skirt, said tongue defining a first plurality of holes therein, said rear skirt defining a second plurality of holes therein, said second plurality being substantially twice said first plurality, said fastening means being receivable through at least two of said first plurality of holes and two of said first plurality of holes.

* * * * *